United States Patent [19]

Birnbaum

[11] Patent Number: 5,200,817
[45] Date of Patent: Apr. 6, 1993

[54] CONVERSION OF AN RGB COLOR SCANNER INTO A COLORIMETRIC SCANNER

[75] Inventor: David Birnbaum, Pittsford, N.Y.

[73] Assignee: Xerox Corporation, Stamford, Conn.

[21] Appl. No.: 752,118

[22] Filed: Aug. 29, 1991

[51] Int. Cl.$^5$ .............................................. H04N 1/46
[52] U.S. Cl. ........................................................ 358/80
[58] Field of Search ..................................... 358/75-80

[56] References Cited
U.S. PATENT DOCUMENTS

| | | | |
|---|---|---|---|
| 4,402,015 | 8/1983 | Yamada | 358/280 |
| 4,409,614 | 10/1983 | Eichler et al. | 358/76 |
| 4,500,919 | 2/1985 | Schreiber | 358/78 |
| 4,727,425 | 2/1988 | Mayne et al. | 358/80 |
| 4,745,467 | 5/1988 | Sekizawa et al. | 358/80 |
| 4,758,885 | 7/1988 | Sasaki et al. | 358/80 |
| 4,887,151 | 12/1989 | Wataya | 358/80 |

OTHER PUBLICATIONS

Fred W. Billmeyer, Jr., et al.; *Principles of Color Technology*, 2ed; J. Wiley & Sons, New York; 1981; p. 63.
J. A. C. Yule, et al.; *Principles of Color Reproduction*; J. Wiley & Sons, New York; 1967; pp. 107–113.

Primary Examiner—Stephen Brinich
Attorney, Agent, or Firm—Oliff & Berridge

[57] ABSTRACT

A color conversion system is disclosed for converting raw RGB scanner data into a colorimetric system. The raw scanner data are processed in three stages. In the first stage, the raw RGB signals are converted into END-like RGB signals. This transformation is performed by passing each RGB signal separately through a lookup table to transform it to the equivalent END signal. In the second stage, the END signals are transformed into tristimulus signals XYZ. In the final stage, the XYZ signals are subjected to a non-linear transformation to convert them into a colorimetric system.

12 Claims, 2 Drawing Sheets

CONVERSION OF AN RGB COLOR SCANNER INTO A COLORIMETRIC SCANNER

BACKGROUND OF THE INVENTION

The present invention relates generally to an electrophotographic printing machine, and more particularly, concerns a system for transforming scanner RGB data into a colorimetric system. The invention is applicable to the transformation of RGB data into colorimetric systems such as CIELAB or CIELUV.

The marking engine of an electronic reprographic printing system is frequently an electrophotographic printing machine. In an electrophotographic printing machine, a photoconductive member is charged to a substantially uniform potential to sensitize the surface thereof. The charged portion of the photoconductive member is thereafter selectively exposed. Exposure of the charged photoconductive member dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a toner image on the photoconductive member which is subsequently transferred to a copy sheet. The copy sheet is heated to permanently affix the toner image thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complementary thereto. This process is repeated a plurality of cycles for differently colored images and their respective complementarily colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid or a powder material.

In the process of black and white printing, the copy sheet is advanced from an input tray to a path internal the electrophotographic printing machine where a toner image is transferred thereto and then to an output catch tray 4 subsequent removal therefrom by the machine operator. In the process of multi-color printing, the copy sheet moves from an input tray through a recirculating path internal the printing machine where a plurality of toner images is transferred thereto and then to an output tray for subsequent removal. With regard to multicolor printing, a sheet gripper secured to a transport receives the copy sheet and transports it in a recirculating path enabling the plurality of different color images to be transferred thereto. The sheet gripper grips one edge of the copy sheet and moves the sheet in a recirculating path so that accurate multi-pass color registration is achieved. In this way magenta, cyan, yellow, and black toner images are transferred to the copy sheet in registration with one another.

Current 3-color scanners function by interposing a set of color filters in front of a broad spectrum photosensitive device. This filter set is usually chosen to be set sensitive to short medium and long wavelength regions of the spectrum (or B, G, R for short). The information produced by the scanner is usually further processed and eventually sent to a printer. In processing the scanned image for presentation to the printer, it is desirable to have the color information in a colorimetric system, such as CIELAB or CIELUV, rather than in terms of the scanner primary colors.

U.S. Pat. No. 4,745,467 to Sekizawa et al. discloses a color image processing apparatus which comprises a color line image sensor, a matrix circuit and a color conversion circuit. The sensor reads a document to output a plurality of fundamental color signals. The matrix converts the signals into a brightness signal and two color difference signals. The color conversion converts the brightness and color difference signals into ink amount control signals. Non-linear conversion circuits are provided to change low level input signals greater than high level inputs.

U.S. Pat. No. 4,409,614 to Eichler et al. discloses a method for reproducing originals in which originals are first scanned and converted into three primary signals having actual color values in a predetermined color coordinate system which are corrected according to visual sensitivity. Primary signals derived from this are then converted to another color coordinate system, have gradation changes or any other non-linear process.

U.S. Pat. No. 4,402,015 to Yamada discloses a picture signal pre-processing method for a picture reproducing machine in which an original picture is scanned photoelectrically to obtain a picture signal. First conversion characteristic data stored in a memory is read out and then changed by second conversion characteristic data depending on a desired reproducible density range of the original.

U.S. Pat. No. 4,727,425 to Mayne et al. discloses an image reproduction system in which digital signals are generated for each pixel of an image to be reproduced corresponding to color values. The values are applied to a set of look up tables to determine if the values fall within a certain range. The look up tables provide an output representing one of a plurality of processing operations for that pixel. The operations may be retouching, replacement tinting, or dropout. The tables define color ranges within which processing operations are required.

U.S. Pat. No. 4,500,919 to Schreiber discloses a color reproduction system for reproducing an original comprising a scanner for producing a train of tristimulus appearance signals, aesthetic correction circuitry for introducing alterations into the signals to provide modified appearance signals, and a colorant selection mechanism for selecting corresponding reproduction values representing values of colorants to produce a color match on a medium of the appearance signals. A model is used which corrects for unwanted absorptions of inks followed by processing in a matrix. After processing, a look up table is used to remove any error.

While the related art recognizes the need for processing the scanned color images, the art does not provide an efficient an effective system for converting RGB scanner data into a colorimetric system via transformation of the raw RGB signals into END-like RGB signals.

OBJECTS AND SUMMARY OF THE INVENTION

Accordingly, one object of the present invention is to provide a color conversion system which overcomes the problems of the related art.

Another object of the present invention is to provide a system for converting raw RGB scanner data into a colorimetric system for presentation to the printer.

Yet another object of the present invention is to provide a conversion system for transforming raw RGB signals from the scanner into a colorimetric system by way of a transformation of the RGB signals into END-like RGB signals.

Still another object of the present invention is to provide a color conversion system for transforming raw RGB signals from the scanner into END-like RGB signals, and subsequently transforming the END signals into tristimulus signals, XYZ, which are subjected to a nonlinear transformation for conversion into a colorimetric system.

To achieve the foregoing and other objects and advantages, and to overcome the shortcomings discussed above, a system for converting RGB scanner data into a colorimetric system is provided. In particular, a system of converting RGB scanner signals includes the steps of scanning an image with a scanner to detect raw RGB signals from the scanned image, transforming the raw RGB signals to equivalent END-like RGB signals by passing each RGB signal separately through a look-up table, transforming the END-like RGB signals into a set of tristimulus values XYZ using a 3×3 matrix multiplication operation, and finally transforming the tristimulus values into colorimetric coordinates by a non-linear transformation.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

1. The Multi-Color Printing System

Figure 1:
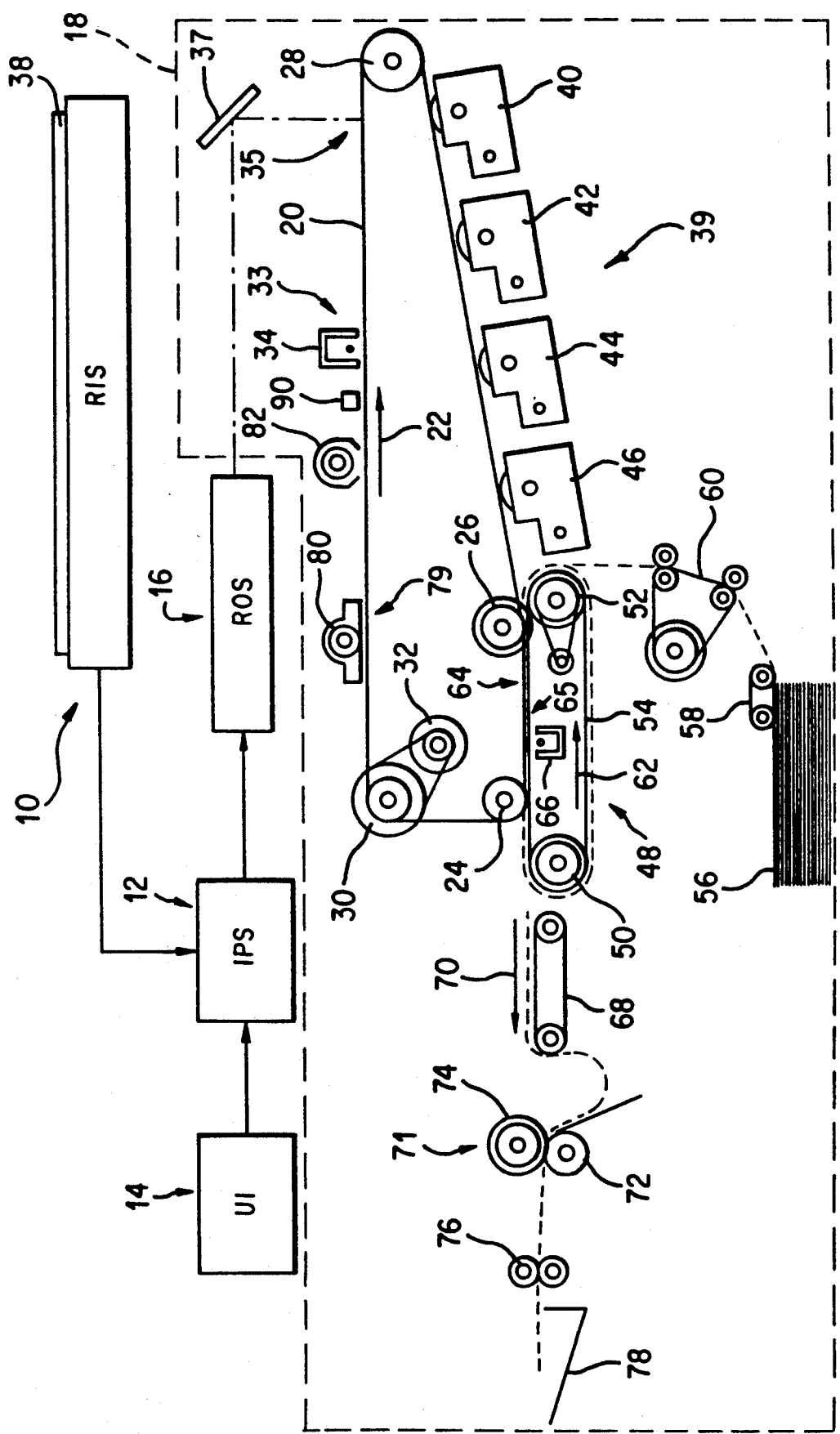
FIG. 1 is a schematic elevational view showing an electrophotographic printing machine incorporating the features of the present invention therein.

Turning initially to FIG. 1, during operation of the printing system, a multi-color original document 38 is positioned on a raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e., red, green and blue densities, at each point of the original document. This information is transmitted to an image processing system (IPS), indicated generally by the reference numeral 12. IPS 12 contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The output signal from UI 14 is transmitted to IPS 12. A signal corresponding to the desired image is transmitted from IPS 12 to ROS 16, which creates the output copy image. ROS 16 lays out the image in a series of horizontal scan lines with each line having a specified number of pixels per inch. ROS 16 includes a laser having a rotating polygon mirror block associated therewith. ROS 16 exposes a charged photoconductive belt 20 of a printer or marking engine, indicated generally by the reference numeral 18, to achieve a set of subtractive primary latent images. The latent images are developed with cyan, magenta, and yellow developer material, respectively. These developed images are transferred to a copy sheet in superimposed registration with one another to form a multi-colored image on the copy sheet. The multi-colored image is then fused to the copy sheet forming a color copy.

With continued reference to FIG. 1, printer or marking engine 18 is an electrophotographic printing machine. Photoconductive belt 20 of marking engine 18 is preferably made from a polychromatic photoconductive material. The photoconductive belt moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having a multi-colored original document 38 positioned thereat. RIS 10 captures the entire image from the original document 38 and converts it to a series of raster scan lines which are transmitted as electrical signals to IPS 12. The electrical signals from RIS 10 correspond to the red, green and blue densities at each point in the original document. IPS 12 converts the set of red, green and blue density signals, i.e., the set of signals corresponding to the primary color densities of original document 38 to a set of colorimetric coordinates. The operator actuates the appropriate keys of UI 14 to adjust the parameters of the copy. UI 14 may be a touch screen, or any other suitable control panel, providing an operator interface with the system. The output signals from UI 14 are transmitted to IPS 12. The IPS then transmits signals corresponding to the desired image to ROS 16. ROS 16 includes a laser with rotating polygon mirror blocks. Preferably, a nine facet polygon is used. ROS 16 illuminates, via mirror 37, the charged portion of photoconductive belt 20 at a rate of about 400 pixels per inch. The ROS will expose the photoconductive belt to record three latent images. One latent image is adapted to be developed with cyan developer material. Another latent image is adapted to be developed with magenta developer material and the third latent image is adapted to be developed with yellow developer material. The latent images formed by ROS 16 on the photoconductive belt correspond to the signals transmitted from IPS 12.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface.

Developer units 40, 42 and 44, respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding of green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document.

Each of the developer units is moved into and out of an operative position. In the operative position, the magnetic brush is closely adjacent the photoconductive belt, while in the non-operative position, the magnetic brush is spaced therefrom. In FIG. 1, developer unit 40 is shown in the operative position with developer units 42, 44 and 46 being in the non-operative position. During development of each electrostatic latent image, only one developer unit is in the operative position, the remaining developer units are in the non-operative position. This insures that each electrostatic image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet 25 is advanced from a stack of sheets 56 disposed on a tray. A friction retard feeder 58 advances the uppermost sheet from stack 56 onto a pre-transfer transport 60. Transport 60 advances sheet 25 to sheet transport 48. Sheet 25 is advanced by transport 60 in synchronism with the movement of a sheet gripper. In this way, the leading edge of sheet 25 arrives at a preselected position, i.e., a loading zone, to be received by the open sheet gripper. The sheet gripper then closes securing sheet 25 thereto for movement therewith in a recirculating path. The leading edge of sheet 25 is secured releasably by the sheet gripper.

As belts 54 move in the direction of arrow 62, the sheet moves into contact with the photoconductive belt, in synchronism with the toner image developed thereon. At transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another. One skilled in the art will appreciate that the sheet may move in a recirculating path for four cycles when under color black removal is used and up to eight cycles when the information on two original documents is being merged onto a single copy sheet. Each of the electrostatic latent images recorded on the photoconductive surface is developed with the appropriately colored toner and transferred, in superimposed registration with one another, to the sheet to form the multi-color copy of the colored original document.

After the last transfer operation, the sheet gripper opens and releases the sheet. A conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to catch tray 78 for subsequent removal therefrom by the machine operator.

The last processing station in the direction of movement of belt 20, as indicated by arrow 22, is a cleaning station, indicated generally by the reference numeral 79. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

2. Conversion of the RGB Signals Into a Colorimetric System

The human visual system is able to distinguish a large number of colors. To cover this range of colors, display devices often provide 256 choices (8 bits) for each of the three primary colors, red, green and blue. This is a total of 24 bits or $2^{24}$ possible colors. To simultaneously render any or all of these colors requires a backing frame buffer with 24 bits per pixel. To reduce cost, a smaller pallet of colors is usually provided which may be selected from this large set. This is implemented by means of a color lookup table. A 256 entry table can be accessed by an 8-bit index. Each table entry can contain a 24-bit color specification. Thus, a frame buffer with only 8-bits per pixel can be used by looking up each pixel value in the color table to obtain 24-bit color. The display can produce $2^{24}$ colors, but can render only 256 of them at any one time.

Color lookup tables as described in copending application Ser. No. 07/574,127 filed Aug. 29, 1990 (the subject matter of which is incorporated herein by reference), have proven useful in their own right. By changing a value in the table, one can alter the appearance of all the pixels which reference this table entry. This is much faster than altering the pixels individually. Color tables can support fast color manipulation, structuring of the image and color correction. The limited set of simultaneous colors, however, presents a problem concerning which colors should be chosen for the color table entries. Scanned images and some computer generated effects contain far more colors than the allowed 256. One must somehow pick colors that do not deviate too far from the true colors of the image. One would also like to reduce the false contours which arise when a smooth variation in color is displayed as a jump between one producible color and the next (this is aliasing in color space).

One approach o this problem is to first analyze the image to determine which colors are most representative. This can be a costly process. An alternative approach is to set the table to a fixed set of distributed colors, and then superimpose half-toning techniques to give the appearance of intermediate colors. In this approach, resolution is being traded for intensity levels of the color primaries. A rectangular, dispersed dot screen applied to each of the primary color components is straightforward and adequate. This gives slightly better results, but must be applied to the entire image, and is not used with individual image components.

Since color is a three-dimensional space, half-toning is applied three times for each pixel to achieve the appearance of intermediate values for each of the three color coordinates. The elements of the color lookup table are partitioned along the color coordinate axis to support the independent halftoning of each coordinate. If the coordinate axis is red, green and blue, the 8-bit color table index may be split into three bits of red, three bits of green, and two bits of blue. This gives eight shades of red, eight shades of green, and four shades of blue, plus all their combinations. Blue is chosen to receive only two bits because the ey is less sensitive to blue. An alternative is to allocate six shades of red, six shades of green, and six shades of blue. The color table is thought of as a three-dimensional array with six elements in each dimension. This gives the mapping from color coordinates to color table index.

There are many possible coordinate systems used in describing color space besides red, green and blue. One alternative is to rotate and scale the axis so that one corresponds to the luminance Y. Luminance is a measure of how bright the color appears (yellow appears brighter than blue). The other two coordinates give chrominance information. This approach is used in the television industry, which implements the YIQ color model. The Y component gives the luminance, which is shown on black-and-white sets. All three coordinates are used for color television.

One color encoding standard describes the YES color model. Again, Y is the luminance, and the E and S coordinates give the chrominance. The E coordinate is the green to red axis, and the S coordinate is the blue to yellow axis using the red, green and blue primaries and white point. One advantage of this color model is that the E and S coordinates are very easy to calculate.

The YES color coordinates are not visually uniform. Equivalent displacements in these coordinates generally do not appear to the eye as equivalent changes in color. There are visually uniform color spaces, notably CIE-LAB and CIELUV color models. Using these coordinates for color table assignments and half-toning gives better results, since the colors appear uniformly distributed, and the halftoning is linear with respect to appearance.

Figure 2:
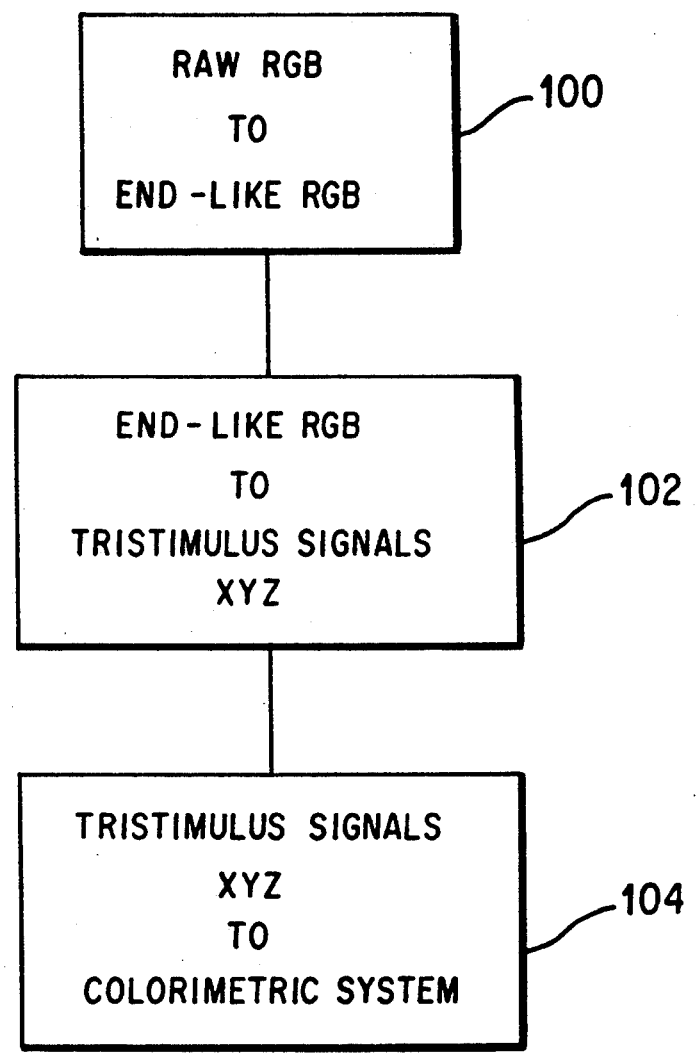
FIG. 2 is a block diagram depicting the steps in the colorimetric conversion system.

The purpose of the present invention is to present a system for transforming the scanner RGB data into a colorimetric system, such as the above-mentioned CIE-LAB, CIELUV, XEROX/YES or NTSC/YIQ. The raw RGB signals from the scanner are first transformed into END-like RGB signals in Step 100 of FIG. 2. END, Equivalent Neutral Density, signals are characterized by the property that for gray or neutral inputs the RGB signals have identical numerical values. Such signals are sometimes also referred to as "graybalanced". The addition of this transformation gives surprisingly better results in terms of the overall color fidelity of the copier when compared to a similar system without the transformation. In the present invention, the RGB signals are first subjected to a transformation into END like signals. The transformation is one which subjects each of the R, G and B signals to a separate transformation. That is, the transformation of each signal is done alone, without regard to the other two signals.

The transformation for each RGB signal is performed by separately passing each signal through a lookup table which can be determined by either analytical means or by direct measurement. In the direct measurement case, a number of gray targets of different densities, e.g., a photographic gray scale, are scanned and the raw RGB signals measured. The desired output signals can be determined by selecting a scale factor relating the digital values to the density of the copy, e.g., a digital value of 255 might correspond to a visual density of 2.0. By using sufficient number of different gray levels in the targets, a suitable lookup table can be constructed by standard numerical interpolation techniques to fill in the missing values.

After the RGB signals are transformed into equivalent END signals, they can be further transformed into a set of tristimulus values XYZ (step 102). This transformation can be performed by electronic means which performs a $3 \times 3$ matrix multiplication operation on the END-like RGB signals. It is best to determine the coefficients of such a matrix empirically, for example by scanning a variety of colored and neutral targets and using standard regression techniques to determine the coefficients of the matrix that give the best match between the known XYZ coordinates of the individual patches and the transformed ones. For systems other than XYZ, e.g., NTSC/YIQ, a similar transformation can be derived in an analogous fashion, although the specific numerical values will be different.

A final transformation is performed in Step 104 wherein the tristimulus values XYZ are transformed into a colorimetric system. The colorimetric system having colorimetric coordinates may involve a non-linear set of operations (such as for CIELAB). In CIELAB, the equations for the transformation are:

$$L^* = 116^*(f(Y/Y_n)) - 16$$

$$a^* = 500^*(f(X/X_n) - f(Y/Y_n))$$

$$b^* = 200^*(f(Y/Y_n) - f(Z/Z_n))$$

where $f(x) = x^{\frac{1}{3}}$ and $X_n$, $Y_n$, $Z_n$ are the tristimulus values of an illuminant. In order to perform this transformation a series of lookup tables are used in order to enable the high speed operation usually associated with image processing in a scanner. A separate set of lookup tables are used for each coordinate (X,Y,Z) to generate the intermediate values $f(Y/Y_n)$, $f(X/X_n)$, $f(Z/Z_n)$. These intermediate values are then passed to a set of adders which then pass their outputs through a set of final lookup tables to perform the final scaling of the a* and b* variables. The intermediate value is passed through a lookup table to generate the appropriate scaling to L*.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of converting RGB scanner signals comprising the steps of:
   scanning an image with a scanning means and detecting raw RGB signals from said scanned image;
   transforming said raw RGB signals to equivalent END-like RGB signals by passing each RGB signal separately through a lookup table;
   transforming said END-like RGB signals into a set of tristimulus values XYZ;
   transforming said tristimulus values XYZ into colorimetric coordinates; and
   providing each of plurality of images on a recording medium in superimposed registration with one another using the colorimetric coordinates to form a multi-color copy of said scanned image.

2. The method of claim 1, wherein the transformation of said tristimulus values XYZ into colorimetric coordinates is by non-linear transformation.

3. The method of claim 1, wherein the tristimulus values XYZ are transformed into CIELAB colorimetric coordinates.

4. The method of claim 3, wherein the step of transforming said tristimulus values XYZ into CIELAB uses equations describing said transformation:

$$L^* = 116^*(f(Y/Y_n)) - 16$$

$$a^* = 500^*(f(X/X_n) - f(Y/Y_n))$$

$$b^* = 200 \ (f(Y/Yn) - f(Z/Z_n))$$

where $f(x) = x^{\frac{1}{3}}$ and $X_n$, $Y_n$ and $Z_n$ are the tristimulus values of an illuminent;

wherein a set of lookup tables is used to generate intermediate values $f(Y/Y_n)$, $f(X/X_n)$ and $f(Z/Z_n)$ from each coordinate (X,Y,Z); and wherein said intermediate values are passed to a set of adders which pass the output through a final set of lookup tables to perform a final scaling of the a* and b* variables.

5. The method of claim 1, wherein the step of transforming the END-like RGB signals into a set of tristimulus values XYZ involves a 3×3 matrix multiplication operation.

6. The method of claim 1, wherein the transformation of said tristimulus values XYZ into colorimetric coordinates, is a transformation into a colorimetric system selected from CIELUV, YES and YIQ.

7. A device for converting RGB scanner signals in an electronic reprographic printing system comprising:
   means for scanning an image and detecting raw RGB signals from said scanned image;
   mean for transforming said raw RGB signals to equivalent END-like RBG signals by passing each RGB signal separately through a lookup table;
   means for transforming said END-like RGB signals into a set of tristimulus values XYZ;
   means for transforming said tristimulus values XYZ into colorimetric coordinates; and
   means for providing each of a plurality of images on a recording medium in superimposed registration with one another using the colorimetric coordinates to form a multi-color copy of said scanned image.

8. The device of claim 3, wherein the means for transforming said tristimulus values XYZ into colorimetric coordinates is by non-linear transformation.

9. The device of claim 7, wherein the means for transforming transforms the tristimulus values XYZ into CIELAB colorimetric coordinates.

10. The device of claim 9, wherein the means for transforming said tristimulus values XYZ into CIELAB uses equations describing said transformation:

$$L^* = 116^*(f(Y/Y_n)) - 16$$

$$a^* = 500^*(f(X/X_n) - f(Y/Y_n))$$

$$b = 200 \ (f(Y/Yn) - f(Z/Z_n))$$

where $f(x) = x^{\frac{1}{3}}$ and $X_n$, $Y_n$ and $Z_n$ are the tristimulus values of an illuminent;

wherein a set of lookup tables is used to generate intermediate values $f(Y/Y_n)$, $f(X/X_n)$ and $f(Z/Z_n)$ from each coordinate (X,Y,Z); and wherein said device further comprises means for passing said intermediate values to a set of adders which pass the output through a final set of lookup tables to perform a final scaling of the a* and b* variables.

11. The device of claim 7, wherein the means for transforming the END-like RGB signals into a set of tristimulus values XYZ involves a 3×3 matrix multiplication operation.

12. The device of claim 7, wherein the means for transforming transforms said tristimulus values XYZ into colorimetric coordinates of a colorimetric system selected from CIELUV, YES and YIQ.

* * * * *